United States Patent [19]
Dahlberg

[11] 4,181,535
[45] Jan. 1, 1980

[54] STARCH PRODUCTION

[75] Inventor: Bengt I. Dahlberg, Uttran, Sweden

[73] Assignee: Alfa-Laval AB, Tumba, Sweden

[21] Appl. No.: 904,376

[22] Filed: May 10, 1978

[30] Foreign Application Priority Data

May 16, 1977 [SE] Sweden ................... 7705679

[51] Int. Cl.² ........................................ C13L 1/00
[52] U.S. Cl. ............................................ 127/68
[58] Field of Search ............................. 127/68

[56] References Cited

U.S. PATENT DOCUMENTS

| 2,072,633 | 3/1937 | Greenfield et al. | |
| 2,437,036 | 3/1948 | Murer et al. | 127/68 X |

OTHER PUBLICATIONS

Alfa-Laval & Maize Starch Process No. TB 40363E, Reg. 4443.0.

*Primary Examiner*—Michael S. Marcus
*Attorney, Agent, or Firm*—Cyrus S. Hapgood

[57] ABSTRACT

The water phase from a corn steeping step is evaporated in a multistage evaporator to a steeping concentrate, the steeped corn being divided into an aqueous germ fraction, an aqueous fiber fraction and a gluten suspension which is partly dewatered to an aqueous gluten fraction. Said three fractions are dried to a low water content by heating while subjected to a direct air flow, causing steam-air flows from said fractions. In the drying of said fractions, the air flow is limited to make the enthalpy of the steam-air flows relatively high, and part of the steam-air flows, preferably combined, is fed to one stage of the evaporator, preferably the first stage to which the water phase from the steeping step is fed.

3 Claims, 1 Drawing Figure

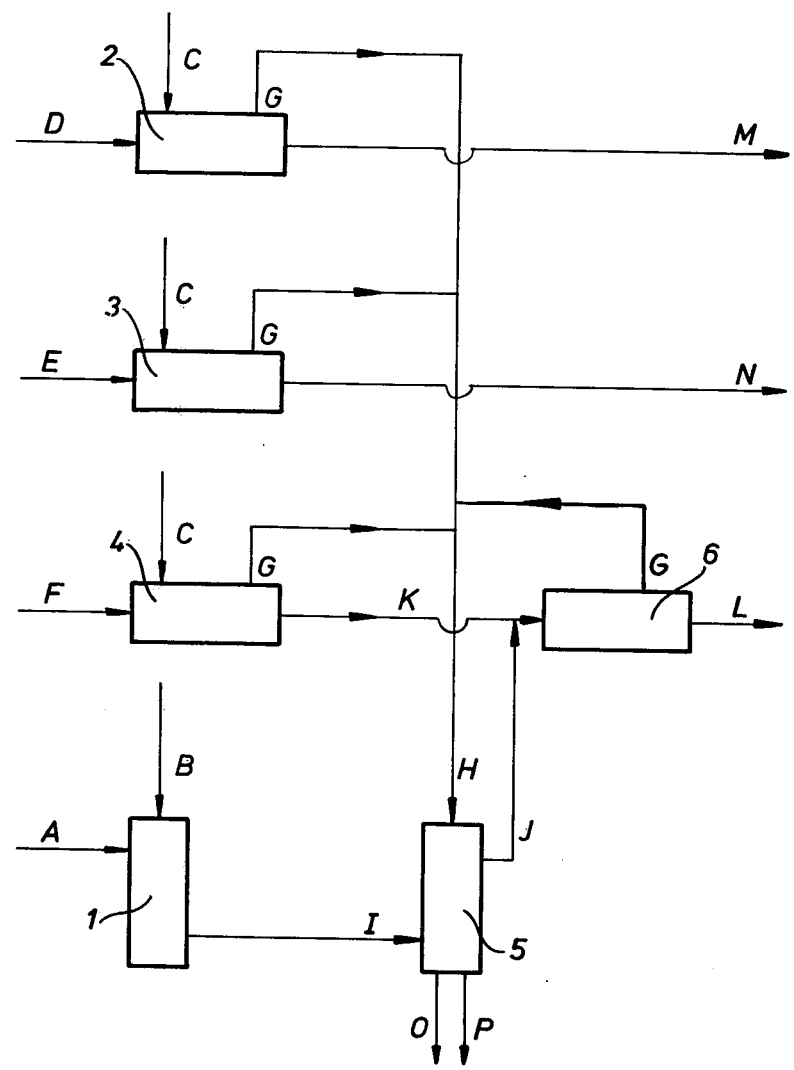

STARCH PRODUCTION

This invention relates to a method of producing starch and byproducts from maize, the corn being steeped in water with the addition of sulfur dioxide at an elevated temperature, the water phase from the steeping stage being evaporated in a multistage evaporator to a steeping concentrate, whereas the steeped corn is divided into (inter alia) one aqueous germ fraction, one aqueous fiber fraction, and a gluten suspension. The latter is partly dewatered to an aqueous gluten fraction, and the germ fraction, the fiber fraction and the gluten fraction are dried to a low residual water content by heating, usually indirectly by steam, while being subjected to a direct air flow, the drying operation giving rise to steam flows from the germ fraction, the fiber fraction and the gluten fraction, which steam flows are mixed with said air flow.

A method of this type is disclosed in the Technical booklet "Alfa-Laval Maize Starch Process" No. TB 40363 E, Reg. 4443.0. According to this process, starch of high purity is produced, a relatively good heat economy being maintained at the same time. The rising energy costs, however, have made this aspect more and more important in the construction of process plants. Possibilities have long been sought for substantially improving the heat economy in a plant intended for a method of the abovementioned type. However, those skilled in the art have been of the opinion that it would not be possible to recover any more substantial amounts of heat from the effluent flows from the process. As is obvious from the foregoing, aqueous fractions of germs, fibers and gluten are dried by blowing air through indirectly heated dryers, usually rotating drum dryers. According to normal practice in use for a long time, large excesses of air are used to utilize the drying equipment efficiently. In this way, however, the relationship water vapor/air in the flow discharged from the dryer will be so disadvantageous that there is no reasonable possibility, considering the low enthalpy, of utilizing thermal energy available.

The heat economy problem, however, has grown more and more urgent.

Thus, an object of this invention is to provide a method of the type previously mentioned which is characterized by a substantially improved heat economy.

According to the invention, this problem is solved by carrying out a method of the aforementioned type in such a way that the air flow is limited when drying said germ, fiber and gluten fractions to make the enthalpy of the steam-air flows formed relatively high, and that at least part of the preferably combined flow of said steam-air flows, in order to give off part of its available thermal energy, is fed to one of the stages of said multistage evaporator for evaporation of the water phase from the steeping stage.

According to a preferred embodiment of the invention, at least part of the preferably combined flow of said steam-air flows is fed to the first stage of said evaporator, to which stage the water phase discharged from the steeping stage is fed.

According to another preferred embodiment of the invention, wherein the flows of steam and air from the drying of germ, fiber and gluten fractions are combined to one steam-air flow, such an air flow and heat input to the dryer are applied that the relationship between the amount of steam and the amount of air in the combined steam-air flow is at least 0.4 kg/kg.

The air flow and the heat input may be adjusted to give a temperature in the combined steam-air flow of at least 100° C.

The invention will now be described more in detail, reference being made to the accompanying drawing in which the single illustration is a flow plan of an embodiment of the invention.

In the drawing (which shows only certain details of a system for carrying out the method), a steeping tank 1 has corn A and water B fed thereto. Dryers for aqueous germ fraction, gluten fraction and fiber fraction are shown at 2, 3 and 4, respectively. Air is fed at C, and aqueous fractions at D, E and F. Steam-air flows are discharged at G from the different dryers to a common line H which leads, together with a line I for steeping liquid, to the first stage of a multistage evaporator 5. In this multistage evaporator, the steeping liquid is evaporated to a steeping concentrate which is combined, via a line J, with dried fiber K coming from the fiber dryer 4, whereupon both are fed to another dryer 6 from which a dried feed mixture L is discharged. Air is fed to the dryer 6 at C, and a steam-air flow is discharged at G. A dried germ fraction is discharged at M and a dried gluten fraction at N. The steam-air flow in line H leaves most of its available energy in the first stage of the evaporator and is discharged in the form of a condensate O and air P, saturated with water vapor. Otherwise, the evaporator operates in a conventional way.

EXAMPLE:

In a system for carrying out the method of the invention, 26.5 tons/h of maize are fed at A to steeping tank 1, from which the following intermediate products are obtained:

| Intermediate Product | Dry solids, tons | Water, tons |
|---|---|---|
| Germ fraction | 1.17 | 1.32 |
| Gluten | 1.52 | 2.58 |
| Fibers | 3.74 | 6.94 |
| Steeping liquid | 1.64 | 21.74 |

As mentioned above, the steeping liquid is evaporated to 50% D.S. and is then mixed with dried fibers. After the drying operation there is obtained:

| Product | Dry solids, tons | Water, tons |
|---|---|---|
| Germs | 1.17 | 0.04 |
| Gluten | 1.52 | 0.17 |
| Fibers + steeping liquid residue | 5.38 | 0.73 |

Thus, 20.10 tons/h water should be removed by evaporation, and 11.54 tons/h by drying. For drying of the aqueous fractions, a steam/air relationship of 0.6 kg/kg is used, and the temperature is adjusted to 110° C. The condensate from the first stage of the evaporator has a temperature of 60° C. Thus, $\frac{2}{3}$ of the available thermal energy in the steam-air flow is regained.

If the evaporator is a conventional one comprising a pre-evaporator of two stages, a post-evaporator of two stages and a thermo-compressor in between the pre- and post-evaporators, the total consumption of steam will be 1100 kgs/h at a pressure of 1 MPa. The specific steam consumption, kg steam fed/kg evaporated water, will be 1.1/20.1=0.055 kg/kg. This value should be compared to a normal value for a system of this type, where the method according to the invention is not applied, of 0.35 kg/kg.

It should be noted that the method of the invention requires somewhat larger drying equipment for a certain plant capacity, regarding the limited air flows that are applied. Considering the substantial saving of energy costs obtained according to the invention, this drawback is believed to be compensated quickly by the gain.

In a method of the type previously mentioned, the aqueous fractions may be combined, for example, to dry the germ and fiber fractions in a common dryer. The invention is, of course, applicable also in this case and similar cases.

I claim:

1. A method of producing starch and byproducts from maize, which comprises the steps of steeping the corn in water with the addition of sulphur dioxide at an elevated temperature, evaporating the water phase from the steeping step in a multistage evaporator to a steeping concentrate, dividing the steeped corn into an aqueous germ fraction, an aqueous fiber fraction and a gluten suspension, partly dewatering said suspension to an aqueous gluten fraction, drying said germ fraction, fiber fraction and gluten fraction to a low residual water content by passing each said fraction into contact with a hot air flow, thereby causing steam flows from said germ fraction, fiber fraction and gluten fraction, mixing said steam flows with said air flow, said method being characterized by the further steps of limiting the air flow, when drying said germ, fiber and gluten fractions, to make the enthalpy of the steam-air flows relatively high, and feeding at least part of said steam-air flows to one of the stages of said multistage evaporator for evaporating the water phase from the steeping step, whereby said steam-air flows give off part of their available thermal energy, said steam-air flows being combined before being fed to said one stage of the evaporator, the air flow and heat input in said drying step being so controlled that the relationship between the amount of steam and the amount of air in the combined steam-air flow is at least 0.4 kg/kg.

2. The method of claim 1, in which said combined steam-air flows are fed to the first stage of said evaporator, the water phase discharged from the steeping step being fed to said first stage.

3. The method of claim 1, in which the air flow and heat input in said drying step are adjusted to provide a temperature of at least 100° C. in the combined steam-air flow.

* * * * *